US012552636B2

(12) United States Patent
Felder

(10) Patent No.: US 12,552,636 B2
(45) Date of Patent: Feb. 17, 2026

(54) ELEVATOR OPERATOR TERMINAL WITH SITUATION- SPECIFIC FLOOR INDICATOR

(71) Applicant: Inventio AG, Hergiswil (CH)

(72) Inventor: Hugo Felder, Buchrain (CH)

(73) Assignee: INVENTIO AG, Hergiswil (CH)

( * ) Notice: Subject to any disclaimer, the term of this patent is extended or adjusted under 35 U.S.C. 154(b) by 1329 days.

(21) Appl. No.: 17/250,987

(22) PCT Filed: Oct. 22, 2019

(86) PCT No.: PCT/EP2019/078750

§ 371 (c)(1),
(2) Date: Apr. 8, 2021

(87) PCT Pub. No.: WO2020/088994

PCT Pub. Date: May 7, 2020

(65) Prior Publication Data

US 2021/0347604 A1 Nov. 11, 2021

(30) Foreign Application Priority Data

Oct. 30, 2018 (EP) .................................... 18203493

(51) Int. Cl.
*B66B 1/46* (2006.01)
*B66B 1/50* (2006.01)
(Continued)

(52) U.S. Cl.
CPC .............. *B66B 1/468* (2013.01); *B66B 1/463* (2013.01); *B66B 1/50* (2013.01); *B66B 1/52* (2013.01);
(Continued)

(58) Field of Classification Search
CPC ........... B66B 1/468; B66B 1/463; B66B 1/50; B66B 1/52; B66B 3/008; B66B 9/00;
(Continued)

(56) References Cited

U.S. PATENT DOCUMENTS 5,821,479 A * 10/1998 Kondo ...................... B66B 3/02 187/397
10,486,938 B2 * 11/2019 Baldi ...................... B66B 1/468
2014/0014444 A1 1/2014 Kauppinen et al.

FOREIGN PATENT DOCUMENTS

CN 101052582 A 10/2007
CN 101068739 A 11/2007
(Continued)

*Primary Examiner* — Bickey Dhakal
(74) *Attorney, Agent, or Firm* — Shumaker, Loop & Kendrick, LLP

(57) ABSTRACT

An elevator operator terminal includes a display device, a storage device and a processing device for use with an elevator system in a building. The processing device is connected to the storage device and activates the display device to generate a user interface having a plurality of display fields. The user interface has a call input area and a floor indicator area. The call input area displays a predetermined first number of display fields that are each associated with a predetermined floor in the building and are enabled for call input. The floor indicator area displays a predetermined second number of display fields that are each associated with a predetermined floor in the building and are disabled for call input.

15 Claims, 3 Drawing Sheets

(51) Int. Cl.
*B66B 1/52* (2006.01)
*B66B 3/00* (2006.01)
*B66B 9/00* (2006.01)

(52) U.S. Cl.
CPC ................ *B66B 3/008* (2013.01); *B66B 9/00* (2013.01); *B66B 2201/103* (2013.01); *B66B 2201/405* (2013.01); *B66B 2201/4615* (2013.01); *B66B 2201/4623* (2013.01); *B66B 2201/463* (2013.01)

(58) Field of Classification Search
CPC ........ B66B 2201/103; B66B 2201/405; B66B 2201/4615; B66B 2201/4623; B66B 2201/463
See application file for complete search history.

(56) References Cited

FOREIGN PATENT DOCUMENTS

| | | | | | |
|---|---|---|---|---|---|
| CN | 103492299 | A | | 1/2014 | |
| CN | 104925599 | A | | 9/2015 | |
| EP | 0699617 | B1 | | 5/2000 | |
| EP | 3015412 | A1 | | 5/2016 | |
| EP | 3184476 | A1 | | 6/2017 | |
| EP | 3318523 | A1 | | 5/2018 | |
| EP | 3326950 | A1 | | 5/2018 | |
| EP | 3345853 | A1 | | 7/2018 | |
| JP | 2015228072 | A | | 12/2015 | |
| WO | 2006041467 | A1 | | 4/2006 | |
| WO | WO-2007108168 | A1 | * | 9/2007 | ............... B66B 3/00 |
| WO | 2012143612 | A1 | | 10/2012 | |

* cited by examiner

ELEVATOR OPERATOR TERMINAL WITH SITUATION- SPECIFIC FLOOR INDICATOR

FIELD

The technology described herein relates generally to an elevator system. Exemplary embodiments of the technology relate in particular to an elevator operator terminal and an elevator system having such an elevator operator terminal. Exemplary embodiments of the technology further relate to a method for operating the call input terminal.

BACKGROUND

In known elevator systems, a passenger can input an elevator call at an elevator operator device, hereinafter referred to as an elevator operator terminal. An elevator operator terminal can be arranged on a floor of a building to allow the input of a floor call from there. Depending on the control technology used in an elevator system, different types of elevator operator terminals are used. An elevator operator terminal for an elevator system with an upward/downward direction control system only allows the desired direction of travel to be input as a floor call with one button for the upward direction and one button for the downward direction. In such an elevator system, an elevator operator terminal in an elevator car allows a passenger to input a car call indicating the desired destination floor, for example, by pressing a button associated with the destination floor. An elevator operator terminal for an elevator system with a destination call control enables the input of the desired destination floor as a floor call, for example, by pressing a button associated with the destination floor. It is then usually no longer possible to input a call in the elevator car.

In particular in very high buildings with a correspondingly large number of floors, a high number of buttons with correspondingly high space requirements may be required to enable the input of all possible destination floors. As an alternative to such buttons, a call input terminal is known from EP 0 699 617 B1 that has a reader for an RFID card presented by a user for call input. However, such readers and the management of RFID cards are not suitable for all buildings, e.g. because they require a relatively high effort in terms of cost and management. Another alternative is known from US 2014/0014444, in which an elevator operator terminal arranged on a floor only displays some floors on a display in the form of a row that the user can touch to input a call. If the user swipes over the display at any point, other floors are displayed. Floors that have already been selected are no longer indicated in the list. Although these alternatives disclose certain solutions to the aforementioned problem of the high number of buttons, there is a need for a technology for an elevator operator terminal that can be used in a plurality of buildings and is user-friendly.

SUMMARY

One aspect of the technology described herein relates to an elevator operator terminal for an elevator system comprising an elevator car and an elevator controller configured to move the elevator car along a travel path in a building having a predetermined number of floors. The elevator control terminal comprises a display device, a storage device, and a processing device. The processing device is connected to the storage device and activates the display device to generate a user interface having a plurality of display fields. The user interface has a call input area and a floor indicator area. The call input area displays a predetermined first number of display fields which are each associated with a predetermined floor and are enabled for call input. The floor indicator area displays a predetermined second number of display fields which are each associated with a predetermined floor, can be shifted into the call input area and are disabled for call input.

Another aspect relates to an elevator system comprising an elevator car, an elevator controller, and an elevator operator terminal. The elevator controller is configured to move the elevator car along a travel path in a building having a predetermined number of floors. The elevator operator terminal is communicatively coupled to the elevator controller and comprises a display device, a storage device, and a processing device. The processing device is coupled to the storage device and activates the display device to generate a user interface having a plurality of display fields. The user interface has a call input area and a floor indicator area. The call input area displays a predetermined first number of display fields which are each associated with a predetermined floor and are enabled for call input. The floor indicator area displays a predetermined second number of display fields which are each associated with a predetermined floor, can be shifted into the call input area, and are disabled for call input.

Another aspect relates to a method for operating an elevator operator terminal comprising a display device and a processing device that activates the display device. According to the method, a user interface having a plurality of display panels is generated, wherein the user interface is displayed by the display device. A call input area is generated on the user interface, wherein the call input area comprises a first number of display fields which are each associated with a predetermined floor. The display fields in the call input area are enabled for a call input. According to the method, a floor indicator area is also generated on the user interface, wherein the floor indicator area comprises a second number of display fields which are each associated with a predetermined floor (L1, L2, L3) and can be shifted into the call input area. The display fields in the floor indicator area are disabled for call input.

In the case of an elevator operator terminal, according to the technology described here, the user interface comprises a call input area and at least one floor indicator area. The call input area shows the display fields that are enabled for call input, while the floor indicator area shows the display fields where (currently) no call input is possible; these display fields are deactivated or disabled. The area in which a call can be input is thus predetermined. This has the advantage that the elevator operator terminal can be arranged (with the call input area as a reference point) in such a manner that the call input area is located within a specified height range (e.g. at a distance of 900 mm to 1200 mm from the floor), regardless of the number of display fields shown in the floor indicator area. The display fields shown remotely from the call input area on the user interface can be used for information but do not need to be touched.

Depending on the number of floors, all or most of the floors are shown on the user interface. This allows flexibility when configuring the elevator operator terminal for a building in terms of the decision how many floors are to be displayed in addition to those in the call input area, without users possibly losing the overview. If not only the display fields currently enabled for call input are shown, but also additional fields in the floor indicator area, it can be easier for a user to find his way around the building with regard to the floors.

In one exemplary embodiment, the processing device is configured to confirm an input call for a travel request to a destination floor by marking the display field corresponding to the destination floor. The marking can be done by a perceptible color and/or pattern selection (e.g., by means of a (background) illumination). The user thus receives confirmation that the call has been registered. In addition, the marked display field remains marked until the call has been carried out. Other users are thus informed which calls have already been made and on which floors the elevator car stops.

In one exemplary embodiment, the processing device can be configured such that, in the case of a plurality of input calls for travel requests to different destination floors, each call is confirmed by marking the display field corresponding to the respective destination floor; the respectively marked display field can be associated with the call input area or the floor indicator area. This enables, e.g., a newly arriving user to quickly recognize which floor or floors shown in the call input area have already been completed, so that there is no need to input the call again.

In one exemplary embodiment, the processing device is configured to generate on the user interface a display field for a convenience function that is set apart from the call input area and floor indicator area. The processing device is configured to register a call input for a travel request to a special floor when the convenience function is used by a user. For this convenience function, a frequently requested floor, such as an entrance hall, can be predetermined as a special floor. As a display field that is set apart, it is easily recognizable by a user.

In one exemplary embodiment, the aforementioned shiftability of display fields from the floor display area to the call input area is carried out by means of a display field for a shift function, which is shown on the user interface. The processing device is configured in this case to replace the display fields shown in the call input area with a corresponding number of display fields from the floor indicator area when a user uses the shift function. This allows a user to “scroll” through the selectable floors until the desired destination floor is shown in the call input area. The display field for the shift function is arranged here at the height of the call input area, which results in the advantages mentioned with regard to the height arrangement.

In one exemplary embodiment, a sum of the first number of display fields and the second number of display fields is smaller than the predetermined number of floors of the building, so that fewer floors are represented than can be operated by the elevator system in the building. This is particularly advantageous in buildings with many floors and not all floors have space on the user interface in the usual/standard size. For example, if a user uses the shift function, he can “scroll” until the top or bottom floor is displayed that is operated by the elevator system. In the technology described herein, the user is made aware that there may still be “many” hidden floors that can be shifted into the call input area by “scrolling”.

In one exemplary embodiment, the processing device is configured to show the display fields of the floor indicator area and the display fields of the call input area arranged row-by-row on the user interface. The display fields of the floor indicator area are arranged in multiple rows. Such a representation in the form of a matrix makes it easier for a user to operate the elevator operator terminal.

In one exemplary embodiment, the processing device is configured to show the display fields in the call input area larger than the display fields in the floor indicator area. This also contributes to simplifying operation and thus user-friendliness.

In addition to simplifying operation of the elevator operator terminal, the technology described here also makes it possible to optimize use of the building or orientation in the building. In one exemplary embodiment, the processing device is configured to show a pictogram that can be activated by a user in a display field shown in the call input area. Upon activation of the pictogram in the call input area, floor-specific information is shown.

DESCRIPTION OF THE DRAWINGS

In the following, various aspects of the improved technology are explained in more detail by means of exemplary embodiments in connection with the figures. All figures are merely schematic illustrations of methods and devices or their components according to exemplary embodiments of the improved technology. In particular, distances and size relations are not reproduced to scale in the figures. In the figures, identical elements have identical reference signs. In the figures.

DETAILED DESCRIPTION

Figure 1:
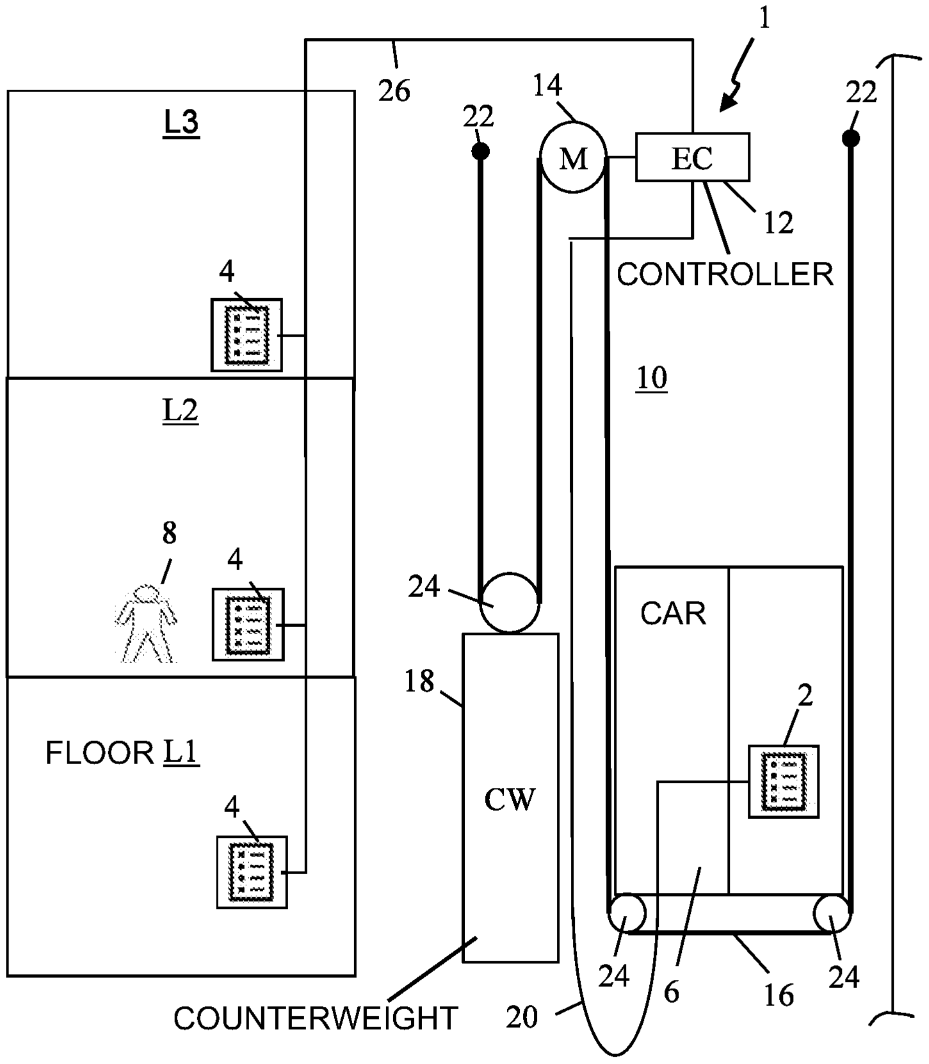
FIG. 1 shows a schematic illustration of an exemplary elevator system according to the invention in a building with several floors.

FIG. 1 shows a schematic illustration of an exemplary embodiment of an elevator system 1 in a building; the building can in principle be any type of multilevel building (e.g., residential building, hotel, office building, sports station, etc.), wherein the technology described here is particularly advantageous in very tall buildings, for example, in buildings with more than about 20 floors. In the following, components and functions of the elevator system 1 are explained as far as they seem helpful for an understanding of the technology described here. The building shown in FIG. 1 has a plurality of floors L1, L2, L3 served by the elevator system 1, i.e., a passenger 8 can be transported from an entry floor to a destination floor by the elevator system 1 after inputting a call at an elevator operator terminal 2, 4.

In the exemplary embodiment shown, the elevator system 1 has an elevator car 6 that is movable along a travel path in the building. For example, the travel path extends along a vertical elevator shaft 10. In another exemplary embodiment, the travel path may extend along a horizontal or inclined plane. In yet another exemplary embodiment, the travel path may have vertical and horizontal sections. In the following, the description of the technology disclosed herein is based on the exemplary elevator system 1 shown in FIG. 1.

The elevator system 1 shown in FIG. 1 also comprises an elevator controller (EC) 12, a drive machine (M) 14, a counterweight 18, a transmission device 20, a suspension means 16 (one or more steel ropes or flat belts) and a plurality of deflection pulleys 24. The suspension means 16 has two ends, each end being attached to a fixed point 22 in the elevator shaft 10. Between the fixed points 22, the suspension means 16 partially wraps around the deflection pulley 24 on the counterweight 18, a traction sheave of the drive machine 14 and the deflection pulleys 24 on the elevator car 6. The elevator system 1 shown is thus a traction elevator, wherein further details, such as, for example, guide rails for the elevator car 6 and guide rails for the counterweight 18, are not shown in FIG. 1. The elevator controller 12 is connected to the drive machine 14 and controls it to move the elevator car 6 in the shaft 10. The function of a traction elevator, the components of which and the tasks of an elevator control 12 are generally known to the person skilled in the art. The person skilled in the art will recognize that the technology described is not limited to use in a traction elevator. The person skilled in the art will also recognize that the elevator system 1 can comprise a plurality of elevator cars 6 or multi-deck cars in one or more elevator shafts 10 or can comprise one or more groups of elevators controlled by a group controller.

In FIG. 1, an elevator operator terminal 4 (also referred to as terminal 4) is arranged on each floor L1, L2, L3 and is coupled to the elevator controller 12 by means of a communication connection 26. The communication connection 26 may be implemented wired (e.g., by individual lines or a communication bus) and/or wireless. Each of these elevator operator terminals 4 can have, for example, a terminal identifier (also referred to as a terminal ID) by which a terminal 4 is identifiable and addressable; for example, the terminal 4 sends a call along with its terminal ID to the elevator controller 12 which confirms the call to the terminal 4 identified by the terminal ID. In this case, information about an associated elevator can also be sent.

In FIG. 1, a further elevator operator terminal 2 is arranged in the elevator car 6 and connected to the elevator controller 12 by means of the transmission device 20. For better distinction, the floor-side elevator operator terminal 4 can be referred to as floor terminal 4 and the car-side elevator operator terminal 2 can be referred to as car terminal 2. For illustration purposes, the elevator operator terminals 2, 4 are shown with the same symbol. The person skilled in the art will recognize that, for example, the floor terminal 4 can be designed only for inputting a desired direction of travel, i.e., it has a button for the upward direction and a button for the downward direction, while the car terminal 2 allows inputting a destination floor.

The floor terminal 4 can be arranged at a desired location on a floor L1, L2, L3, e.g., on a building wall or freestanding at a desired location. The location can be, e.g., an anteroom in front of one or more elevator (floor) doors or an entrance to an elevator lobby. While the location is relatively freely selectable, there are specifications (e.g. according to a standard or of legal nature) in terms of in which height range the floor terminal 4 or a user interface of the floor terminal 4 is to be arranged. This is to ensure that the floor terminal 4 is located at a height at which the floor terminal 4 or the user interface can be reached by potential users and displayed information can be perceived. Exemplary potential users include standing users (adults and children, with or without hand/arm mobility limitations) and seated users (e.g., in a wheelchair). In an exemplary standard (EN81-70), the height range is specified between 900 mm and 1200 mm. Corresponding requirements could also exist for the arrangement of the car terminal 2.

In one exemplary embodiment, the transmission device 20 comprises an electric cable provided, for example, in a traction elevator for transmitting electrical energy and electrical signals and extending between the elevator car 6 and a fixed point to which the elevator controller 12 is coupled. For this purpose, the electrical cable has electrical power and signal lines. For example, the electrical cable supplies electrical energy to the elevator car 6 and transmits signals (e.g., load, status, and/or car call information) to and from the elevator car 6. The electrical cable is also known to the person skilled in the art as a (flat) traveling cable and is therefore referred to as such below. Devices that couple the traveling cable, on the one hand, to the elevator controller 12 and its power/voltage supply and, on the other hand, to the elevator car 6 and its electrical and electronic components are therefore known to the person skilled in the art. The person skilled in the art will recognize that the car terminal 2 is electrically coupled to the traveling cable.

Figure 2:
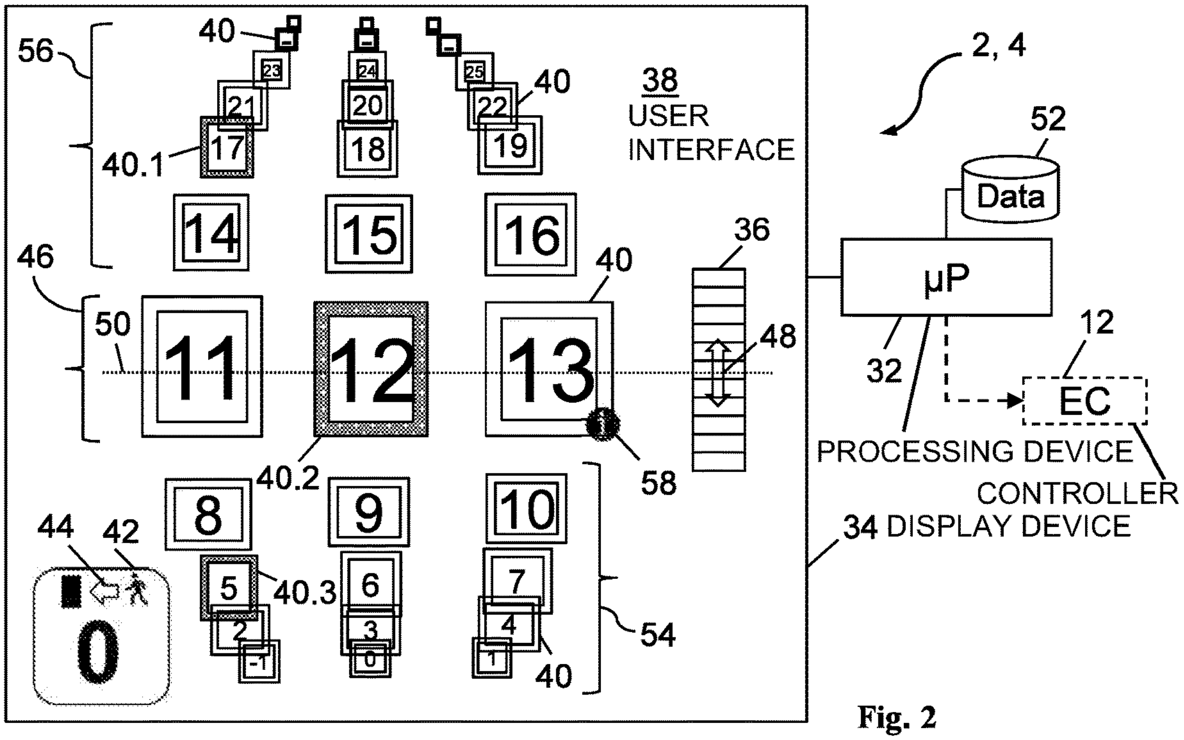
FIG. 2 shows a schematic illustration of an exemplary embodiment of an elevator operator terminal.

FIG. 2 shows a schematic illustration of an exemplary embodiment of an elevator operator terminal 2, 4 that has a processing device 32 (μP), a storage device 52 and a display device 34. In one exemplary embodiment, the storage device 52 stores a computer program that the processing device 32 executes during operation. The processing device 32 controls the display device 34, as described below; it is also communicatively connected to the elevator controller 12 which is shown with dashed lines in FIG. 2 for illustrative purposes.

In one exemplary embodiment, the display device 34 comprises a touch-sensitive screen, hereinafter referred to as a touch screen. The operating mode and structure of a touch screen are generally known to the person skilled in the art; the person skilled in the art knows in particular, for example from the programming and use of smartphones, how symbols, pictograms, input and output fields, etc. are generated on a touch screen and shown on the user interface. It is also known to the person skilled in the art that the components of the elevator operator terminal 2, 4 can be arranged, for example, in a housing so that the elevator operator terminal 2, 4 can be arranged at the desired location in the elevator car 6 or on a floor L1, L2, L3.

Controlled by the processing device 32, the display device 34 displays a user interface 38 depending on the situation prevailing in the elevator system 1. By means of this user interface 38, a user can, for example, input a call and receive information about the prevailing situation, for example, about calls made and confirmed. In addition to this user interface 38, the terminal 2, 4 in one exemplary embodiment has a speaker (not shown) for outputting acoustic messages.

In the exemplary embodiment shown in FIG. 2, the user interface 38 displays a current screen content; the screen content can also be referred to as window content. The person skilled in the art will recognize that the screen content (window content) can change when operated by a user, for example, following a call input. The exemplary user interface 38 displays a plurality of fields 36, 40, 42, only some of which are indicated by reference signs for illustrative purposes. The fields 40 are numbered and arranged in rows, in the example shown here in three columns, i.e., three fields 40 are arranged in each row. Each of these fields 40 corresponds to a floor that can be served by the elevator system 1. In this exemplary embodiment, the fields 40 for the floors −1 to 25 are shown legibly, illustrating that above the floor 25, further floors can be reached by the elevator system 1, which is indicated in FIG. 2 by the two uppermost rows in which the fields 40 are already too small in the spatial representation to show numbers in a recognizable manner. Some of the fields 40 shown are marked; they are designated as fields 40.1, 40.2, 40.3. In the following, the fields 40 are referred to as display fields 40.

In the situation shown in FIG. 2, the display fields 40 for the floors 11, 12, 13 are arranged in an area around an axis

50; they are shown enlarged and can be selected by the user; this area is referred to below as call input area 46.

In one exemplary embodiment, the user can operate the field 36 to be able to display other display fields 40 for floor selection. The field 36 represents a functionality that allows the user to change a portion of the screen content by virtually "scrolling" through the floors. For example, from the user's point of view, the user can scroll up or down; if the user swipes down with a finger, display fields 40 for higher floors are increasingly enlarged row by row (or they move increasingly from the background to the foreground), whereas if the user swipes up with a finger, display fields 40 for lower floors are increasingly enlarged row by row. In FIG. 2, this functionality is indicated by a double arrow 48. Such scrolling or shifting functionality is similar to a "scroll" function known from computer technology. In another exemplary embodiment, the functionality of the field 36 may also be extended to a larger area of the user interface 38, for example the entire area. In this case, a user's swipe motion can be carried out over a larger area, which may facilitate operation because it may be more intuitive for some users.

The person skilled in the art will recognize that in another exemplary embodiment, the user interface 38 can illustrate the display fields 40 and the input area 46 in a different arrangement, for example with one, two, four, or more columns. For example, the input area 46 can extend perpendicular to the axis 50 and can comprise one, two, or more than three display fields 40. In addition, the display fields 40 can be displayed in a more or less overlapping manner to intuitively illustrate spatiality or shiftability. Because of the illustration of a spatiality desired in one exemplary embodiment, the display fields 40 in the area around the axis 50 are shown larger than the remaining display fields 40 (they appear quasi in the foreground), wherein the remaining display fields 40 are shown smaller the further away they are from the axis 50 (they appear quasi in the background or they are not shown because, e.g., the number of floors is too high).

In one exemplary embodiment, the display fields 40 can be displayed highlighted once they are shifted into the call input area 46. Such highlighting can be accomplished, e.g., by the coloring and/or brightness of the display fields 40 and/or the shape of the display fields 40. This makes it possible to signal to a user that these display fields 40 are now in the selectable area.

The mentioned remaining display fields 40, i.e. those displayed outside the call input area 46, are displayed in a floor indicator area 54, 56. In FIG. 2, two floor indicator areas 54, 56 are shown as examples, one (54) below the call input area 46 and one (56) above the call input area 46. Each of these display fields 40 is assigned a predetermined floor L1, L2, L3. As stated elsewhere in this description, no call input is possible at the display fields 40 of the floor indicator area 54, 56; they are used, for example, to inform a user and/or to orient the user.

In FIG. 2, the display fields 40 show the floors associated with them in sequential (ascending) numbering. In another exemplary embodiment, the display fields 40 show only the floors most frequently approached. This may then be desired, e.g., in the case of a very large number of floors and limited screen space, in order to facilitate operation. The display fields 40 of the most frequently approached floors may be highlighted and/or enlarged.

In one exemplary embodiment, the user interface 38 displays the field 42 shown in FIG. 2 regardless of the situation, and in particular, the field 42 is displayed regardless of any scrolling by the user. In one exemplary embodiment, the user interface 38 continuously displays the field 42 during operation. In FIG. 2, the field 42 shown is associated with a floor on which a building entrance and/or lobby is located, which is illustrated by the numeral "0"; that a user can exit the building on this floor is illustrated by an arrow 44 in connection with a symbol for walking person. A frequently selected floor, such as the entrance hall floor, therefore does not require "scrolling", making it easier to operate also for visitors who may not be familiar with the building. As such, the field 42 provides a convenience function that allows for convenient call input. The person skilled in the art will recognize that in another exemplary embodiment, more than one field 42 can be provided for a convenience function.

In FIG. 2, it can also be seen that an information symbol 58 is shown in or near a display field 40 associated with the 13th floor. The user can touch the information symbol 58 to obtain information stored for that floor. The information may be displayed to the user, which is indicated by an information field 60 in FIG. 3. Depending on the type of building, the information can comprise business information (e.g., names of companies or service providers (e.g., law firms or medical offices)) or private information (e.g., names of residents). Additionally or alternatively, the information can also be output as a voice message. The person skilled in the art will recognize that additional display fields 40 in the call input area 46 may each include such an information symbol.

Figure 3:
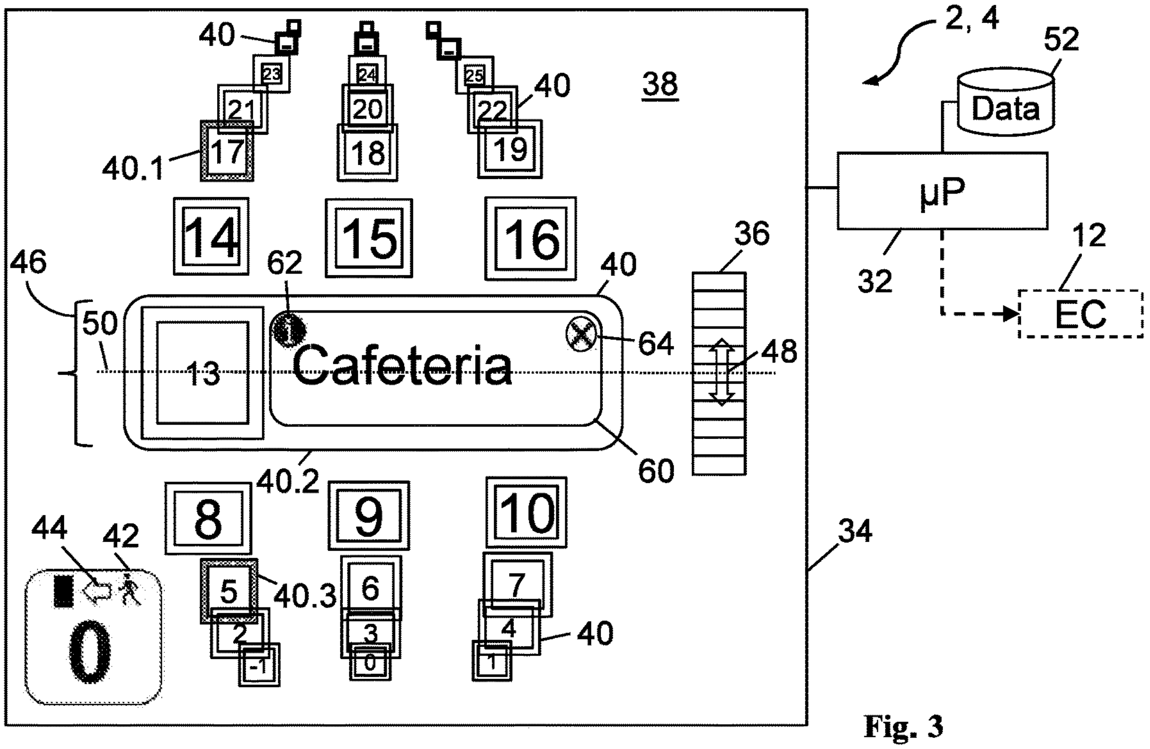
FIG. 3 shows a schematic illustration of another exemplary embodiment of an elevator operator terminal.

In the exemplary embodiment shown, the information field 60 shown in FIG. 3 comprises an information symbol 62 by means of which the user can obtain more detailed information. For illustrative purposes, the information field in FIG. 3 relates to a cafeteria. The more detailed information retrievable by touching the information symbol 62 can show, e.g., the opening hours, contact information, and/or the menu of the cafeteria. The more detailed information may additionally or alternatively comprise displaying an optical code, e.g., QR code. The information field 60 can be closed by touching a symbol 64. In another exemplary embodiment, the information field 60 is closed when the elevator call (here, floor 13) is made; the information field 60 can confirm to a user, for example, that the correct floor has been found.

In FIG. 3, the information field 60 extends along the call input area 46 and covers the display fields 40 for floors 11 and 12 shown in FIG. 2. The person skilled in the art will recognize that the information field 60 can be displayed in a different manner, e.g., in a different orientation (e.g., vertical) or in the form of a speech bubble extending from the display field 40 for floor 13 and leading to an area of the user interface 38 which may block fewer display fields 40.

With the understanding of the above-described principal system components of the elevator system 1 and its functionalities, a description of an exemplary method for operating an elevator operator terminal 2 arranged in the elevator system 1 is provided below with reference to FIG. 4. The description is provided with reference to an elevator operator terminal 2 arranged in the elevator car 6. The elevator system 1 is in operation (i.e., not in standby mode). The method shown in FIG. 4 starts in a step S1 and ends in a step S7. The person skilled in the art will recognize that the division into the steps shown is exemplary, and that one or more of these steps can be divided into one or more sub-steps, or that several of the steps can be combined into one step.

The elevator operating device 2 is activated and its processing device 32 controls the display device 34. The activation generates a user interface 38 that is shown by the display device 34. The generated user interface 38 comprises a plurality of display fields. In FIG. 4, this is done in a step S2.

In a step S3, a call input area 46 is generated on the user interface 38. The call input area 46 comprises a first number of display fields 40 which are each associated with a predetermined floor L1, L2, L3. In FIG. 2, these are the floors 11, 12 and 13.

In a step S4, the display fields 40 in the call input area 46 are enabled for a call input. That is, a user can touch a display field 40 shown in the call input area 46 to input an elevator call to the floor associated with the display field 40.

In a step S5, a floor indicator area 54, 56 is generated on the user interface 38. The floor indicator area 54, 56 comprises a second number of display fields 40 which are each associated with a predetermined floor L1, L2, L3. In FIG. 2, two floor indicator areas 54, 56 are shown as examples: Floor indicator area 54 relates to the floors (here: floors −1 to 10) that are below the floors displayed in the call input area 46 (here: floors 11 to 13), and the floor indicator area 56 relates to the floors (here: floors 16 to "top floor") that are above the floors displayed in the call input area 46 (here: floors 11, 12 and 13).

In a step S6, the display fields 40 in the floor indicator area 54, 56 are disabled for a call input. This means that a user can see a display field 40 shown in the floor display area 54, 56, but a call input is not possible by means of the display fields 40 in the floor indicator area 54, 56.

The person skilled in the art will recognize that the processing device 32 of the elevator operator terminal 2 dynamically adapts the user interface 38 to the situation prevailing in the elevator system 1. Each of the situations shown in FIG. 2 and FIG. 3 represents a momentary situation that may change as a result of, for example, a user action. For example, an action by a user results in the situation shown as an example in FIG. 3, which arises from the situation shown in FIG. 2.

The exemplary user interfaces 38 shown in FIG. 2 and FIG. 3 show situations in which users have already input multiple calls. Accordingly, the user interface 38 shows the confirmed calls. In FIGS. 2 and 3, for example, these are calls to floors 17, 12 and 5, and display fields 40.1, 40.2, 40.3 are marked accordingly. The display fields 40.1, 40.2, 40.3, for example, can be fully or partially illuminated (e.g., only a frame), with or without color accentuation. The user thus recognizes, for example, which floors the elevator car 6 is approaching.

Among the confirmed calls, there may be a call that a user has input on a floor. If the elevator operator terminal 2 is arranged in the elevator car 6, the user interface 38, in an exemplary embodiment, can mark this floor call by a special marking (e.g., by means of color). Users in the elevator car 6 can therefore prepare for the boarding of another user, for example by clearing the door area, thereby avoiding possible delays.

In an exemplary embodiment, the boarding user in the elevator car 6 can input a car call to the desired destination floor. Depending on the situation, the desired destination floor may already be associated with a display field 40 shown in the call input area 46, which the user can touch to input the call. These display fields 40 are highlighted by their size and are easily recognizable by the user. If the desired destination floor is not in the call input area 46, the user can use the field 36 (or a larger area on the user interface 38, as described above) to "scroll" in the direction of higher or lower floors until the destination floor appears in the call input area 46. Alternatively, the user can touch the field 42 for the convenience function described above.

Figure 4:
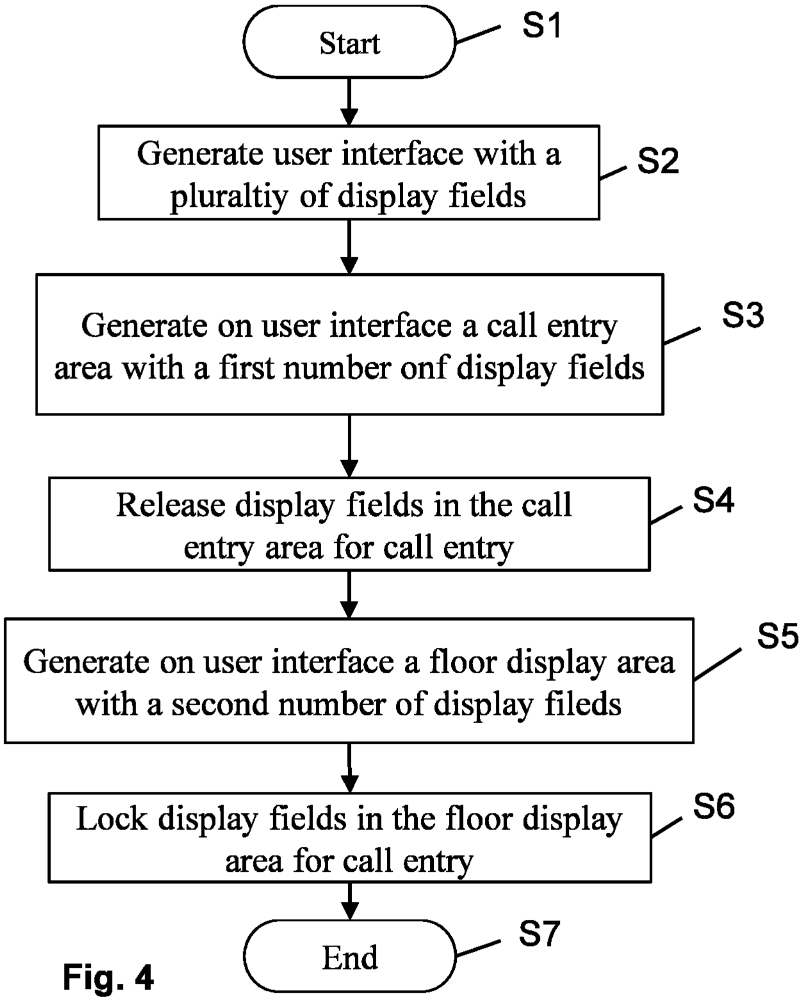
FIG. 4 shows an exemplary illustration of an exemplary embodiment of a method for operating an elevator operator terminal.

For the exemplary description of the method according to FIG. 4, the elevator operator terminal 2 is arranged in the elevator car 6. The person skilled in the art will recognize that the technology described herein is not limited to this application; it can be used in the elevator system 1 both on a floor L1, L2, L2 and in the elevator car 6. If the technology is used on the floor, the elevator operator terminal 4 is configured, for example, to input destination calls. In this case, selecting the destination floor is carried out as described above.

Regardless of whether the elevator operator terminal 2, 4 is arranged on a floor L1, L2, L3 or in the elevator car 6, the technology described here provides the advantage that the call input can be made at a height that lies in the height range between 900 mm and 1200 mm (e.g. in accordance with EN81-70). With the technology described here, this is ensured, among other things, even if there are very many floors. By means of the implemented scroll function, in particular by means of the field 36, a user can also shift the display fields 40 for (from the user's point of view) "distant" floors (which may be either relatively small or not yet displayed at all on the user interface 38) into the call input area 46.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator operator terminal for an elevator system, the elevator system including an elevator car and an elevator controller adapted to move the elevator car along a travel path in a building having a predetermined number of floors, the elevator operator terminal comprising:

a display device;

a storage device;

processing device connected to the storage device and activating the display device to generate a user interface having a plurality of display fields, a call input area and a floor indicator area;

wherein the call input area displays a predetermined first number of the display fields that are each associated with a predetermined one of the floors;

wherein the floor indicator area displays a predetermined second number of the display fields that are each associated with a predetermined one of the floors; and wherein the user interface is operable to shift the display fields between the call input area and the floor indicator area, each of the display fields being enabled for call input related to the associated floor when in the call input area and being disabled for call input when in the floor indicator area.

2. The elevator operator terminal according to claim 1 wherein the processing device is adapted to confirm an input call for a travel request to a destination floor by marking a one of the display fields corresponding to the destination floor.

3. The elevator operator terminal according to claim 2 wherein, in response to a plurality of input calls for travel requests to different destination floors, the processing device confirms each of the input calls by marking a one of the display fields corresponding to the destination floor associated with the input call whether the marked display field is in the call input area or in the floor indicator area.

4. The elevator operator terminal according to claim 1 wherein a sum of the first number of the display fields and the second number of the display fields is smaller than the predetermined number of floors of the building such that fewer of the floors are represented by the displayed display fields than are served by the elevator system.

5. The elevator operator terminal according to claim 1 wherein one of the display fields provides a convenience function and is set apart from the call input area and the floor indicator area, wherein the processing device is adapted to register a call input for a travel request to a special floor when a user uses the one display field to input a call related to the convenience function.

6. The elevator operator terminal according to claim 1 wherein one of the display fields provides a shift function and the processing device is adapted to replace the display fields displayed in the call input area with a corresponding number of the display fields displayed in the floor indicator area when a user uses the one display field to shift the corresponding number of the display fields from the floor indicator area to the call input area.

7. The elevator operator terminal according to claim 1 wherein the display fields displayed in the floor indicator area and the display fields displayed in the call input area are arranged row by row and the display fields displayed in the floor indicator area are arranged in a plurality of the rows.

8. The elevator operator terminal according to claim 1 wherein the display fields displayed in the call input area are displayed larger than the display fields displayed in the floor indicator area.

9. The elevator operator terminal according to claim 1 wherein the processing device is adapted to display a user-activatable pictogram in one of the display fields displayed in the call input area.

10. The elevator operator terminal according to claim 9 wherein the processing device is adapted to display floor-specific information on the user interface upon activation of the pictogram in the call input area.

11. An elevator system comprising:
- an elevator car;
- an elevator controller controlling movement of the elevator car along a travel path in a building having a predetermined number of floors; and
- the elevator operator terminal according to claim 1 in communication with the elevator controller for inputting calls associated with the floors.

12. A method for operating an elevator operator terminal, the method comprising the steps of:
- providing an elevator operator terminal comprising:
  - a display device;
  - a storage device; and
  - a processing device connected to the storage device;
- generating a user interface having a plurality of display fields and displaying the user interface on the display device;
- generating a call input area on the user interface that displays a first number of the display fields that are each associated with a predetermined one of a number of floors of a building;
- enabling each of the display fields in the call input area for a call input;
- generating a floor indicator area on the user interface that displays a second number of the display fields that are each associated with the predetermined one of the floors; and
- disabling each of the display fields in the floor indicator area for a call input.

13. The method according to claim 12 further comprising marking a one of the display fields corresponding to a destination floor, wherein the destination floor corresponds to an input call for a travel request to the destination floor.

14. The method according to claim 12 further comprising generating a one of the display fields to provide a convenience function on the user interface that is set apart from the call input area and the floor indicator area, wherein the processing device is adapted to register a call input for a travel request to a special floor when a user uses the one display field to input a call related to the convenience function.

15. The method according to claim 12 further comprising generating a one of the display fields to provide a shift function on the user interface, wherein the processing device is adapted to replace the display fields displayed in the call input area with a corresponding number of display fields displayed in the floor indicator area when a user uses the one display field to shift the corresponding number of the display fields from the floor indicator area to the call input area.

* * * * *